Jan. 27, 1959  C. S. BROAD  2,871,338
JOINING OF CUPREOUS METALS AND ALLOYS
Filed March 20, 1957
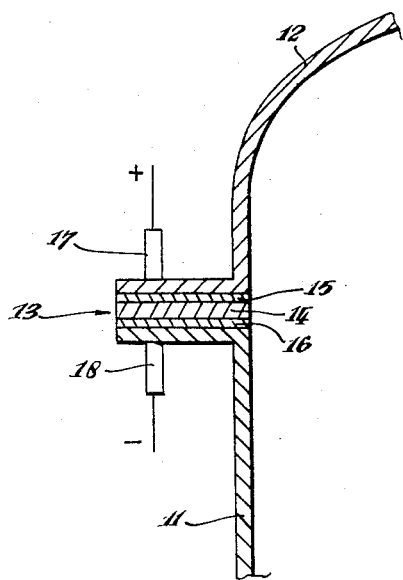
Inventor
Charles Samuel Broad
by Albert Jacobs
Attorney United States Patent Office 2,871,338
Patented Jan. 27, 1959

2,871,338
JOINING OF CUPREOUS METALS AND ALLOYS

Charles Samuel Broad, London, England, assignor to Gallay Limited, a company of Great Britain and Northern Ireland and Cyril Terence Delaney, both of London, England Application March 20, 1957, Serial No. 647,268

4 Claims. (Cl. 219—117)

This invention relates to the joining of cupreous metals and alloys, and particularly to adhesive joining such as welding or soldering.

Cupreous metals and alloys, for example, brass, usually are secured together by soldering when an adhesive joint is required. However, a soldered joint is not altogether satisfactory in all conditions of use; for example, when the header covers of a motor vehicle radiator are secured by soldering to the body of the radiator the continued vibration of the vehicle and radiator eventually causes leakage in the joint.

It has been proposed to effect the joining of cupreous metals and alloys, and particularly brass, by resistance welding, but owing to the high heat conductivity of such metals and alloys, and therefore rapid dissipation of the generated heat from the locality of the joint, it has been necessary to use a large power, for example, in the region of 150 kva., and even in such circumstances a resistance welded brass joint is not altogether efficient in resisting high gaseous or liquid pressures or mechanical vibration.

The object of the present invention is to provide improvements in resistance welded spot or seam joints between cupreous metals or alloys, and particularly brass.

According to this invention, a method of resistance welding cupreous metals or alloys comprises disposing between the surfaces which are to be adhesively secured together a lamina of metal or alloy which has a lower heat conductivity than said cupreous metal or alloy and which is furnished with a solder coating on both surfaces, and thereafter applying a welding current thereto. The lamina may be ferrous metal or alloy coated with tin, silver or other solder.

One embodiment of the invention is illustrated in the accompanying drawing, which is a diagrammatic sectional elevation.

The articles which are to be joined to each other are the brass body 11 and cover 12 of a container, for example, a motor vehicle radiator. A thin lamina 13, comprising a strip 14 of mild steel with coatings 15 and 16 of tin on both sides, is placed between the surfaces of the brass articles 11 and 12 which are to be joined. The lamina 13 may have a total thickness of .0045 inch, made up of mild steel .0039 inch thick with a tin coating .0003 inch thick on both sides.

The joint may be effected by resistance spot or seam welding in a welding machine of comparatively low power, for example, in the region of 25 kva., using welding heads 17 and 18, and it has been found that the joint has considerable efficiency in resisting high gaseous or liquid pressures or mechanical vibration.

What I claim and desire to secure by Letters Patent is:
1. A method of resistance welding cupreous metals or alloys, comprising disposing between the surfaces which are to be adhesively secured together a lamina of metal or alloy which has a lower heat conductivity than said cupreous metal or alloy and which is furnished with a solder coating on both surfaces, and thereafter applying a welding current thereto.
2. A method according to claim 1, wherein the said lamina comprises a strip of ferrous metal or alloy coated with solder on both faces.
3. An article comprising at least two members of cupreous metal or alloy joined together by the method according to claim 1.
4. A method according to claim 1, wherein the said lamina comprises a strip of mild steel coated with solder on both faces.

References Cited in the file of this patent
UNITED STATES PATENTS

| 625,117 | Martin | May 16, 1899 |
| 1,458,274 | Clawson | June 12, 1923 |
| 1,636,656 | Capicatto | July 19, 1927 |
| 1,845,322 | Neuhauss | Feb. 16, 1932 |
| 1,892,607 | Bundy | Dec. 27, 1932 |
| 2,151,758 | Gier | Mar. 28, 1939 |